United States Patent [19]
Lake

[11] Patent Number: 5,536,596
[45] Date of Patent: Jul. 16, 1996

[54] METHOD OF FORMING A BUTTON-TYPE BATTERY AND BUTTON-TYPE BATTERY

[75] Inventor: Rickie C. Lake, Eagle, Id.

[73] Assignee: Micron Communications, Inc., Boise, Id.

[21] Appl. No.: 543,706

[22] Filed: Oct. 16, 1995

[51] Int. Cl.$^6$ ............................................. H01M 6/12
[52] U.S. Cl. ................................. 429/162; 29/623.1
[58] Field of Search ............................ 429/162, 157, 429/209, 156, 164; 29/623.1

[56] References Cited

U.S. PATENT DOCUMENTS

| | | | |
|---|---|---|---|
| 2,724,733 | 11/1955 | Hagspihl et al. | 429/237 |
| 4,460,666 | 7/1984 | Dinkler et al. | 429/236 |
| 4,666,799 | 5/1987 | Runquist et al. | 429/162 X |
| 4,925,751 | 5/1990 | Shackle et al. | 429/191 |

*Primary Examiner*—Anthony Skapars
*Attorney, Agent, or Firm*—Wells, St. John, Roberts, Gregory & Matkin

[57] ABSTRACT

A button-type battery includes, a) a conductive first terminal housing member; b) a conductive second terminal housing member; c) an anode, a cathode and an electrolyte between the anode and cathode; the anode, the cathode and the electrolyte being collectively received intermediate the first and second terminal housing members; the first and second terminal housing members forming an enclosed housing which holds and protects the anode, the cathode and the electrolyte; and d) the anode having an operative surface within the enclosed housing which faces the cathode, the operative anode surface having been roughened prior to final assembly of the button-type battery. A method of forming a button-type battery comprising the following includes, a) providing an anode within a first terminal housing member, the anode having an outer exposed surface; b) preferably with the anode within the first terminal housing member, roughening the outer exposed anode surface to increase its surface area from that prior to the toughening; and c) assembling the first terminal housing member with the toughened anode therein with a cathode, electrolyte and second terminal housing member to form an enclosed housing which holds and protects the anode, the cathode and the electrolyte. Alternately, the outer exposed anode surface comprises a passivation barrier film, and the toughening includes penetrating through the outer exposed barrier film and anode surface to roughen such surface to increase its surface area from that prior to the penetrating and to expose anode material therebeneath.

33 Claims, 4 Drawing Sheets

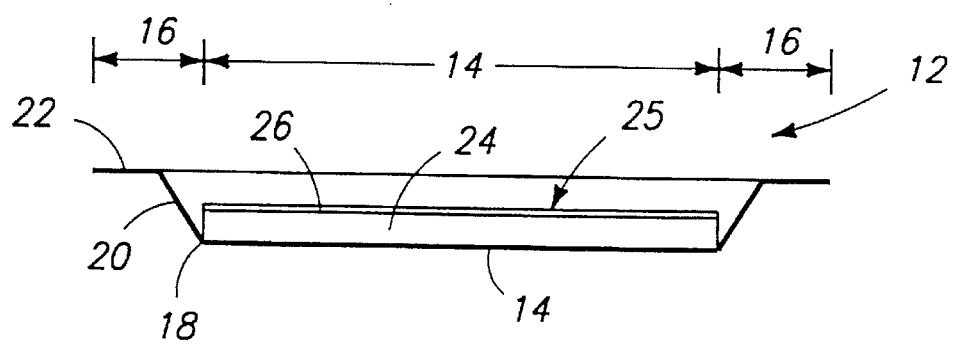
_FIG. 1_
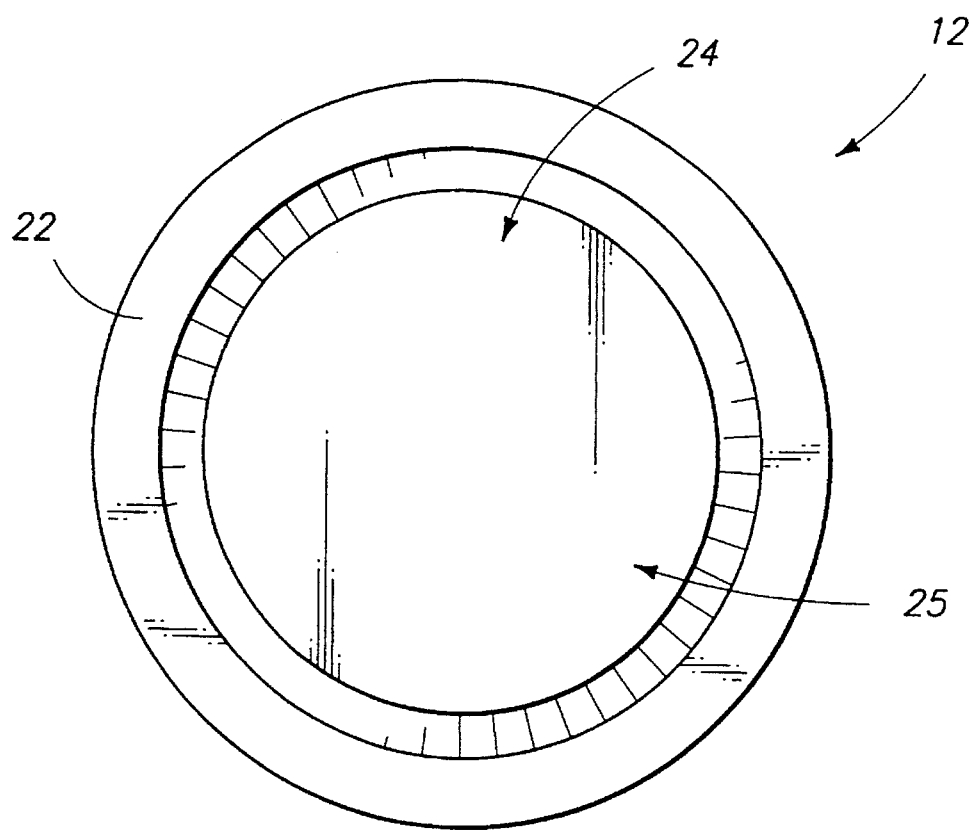
_FIG. 2_

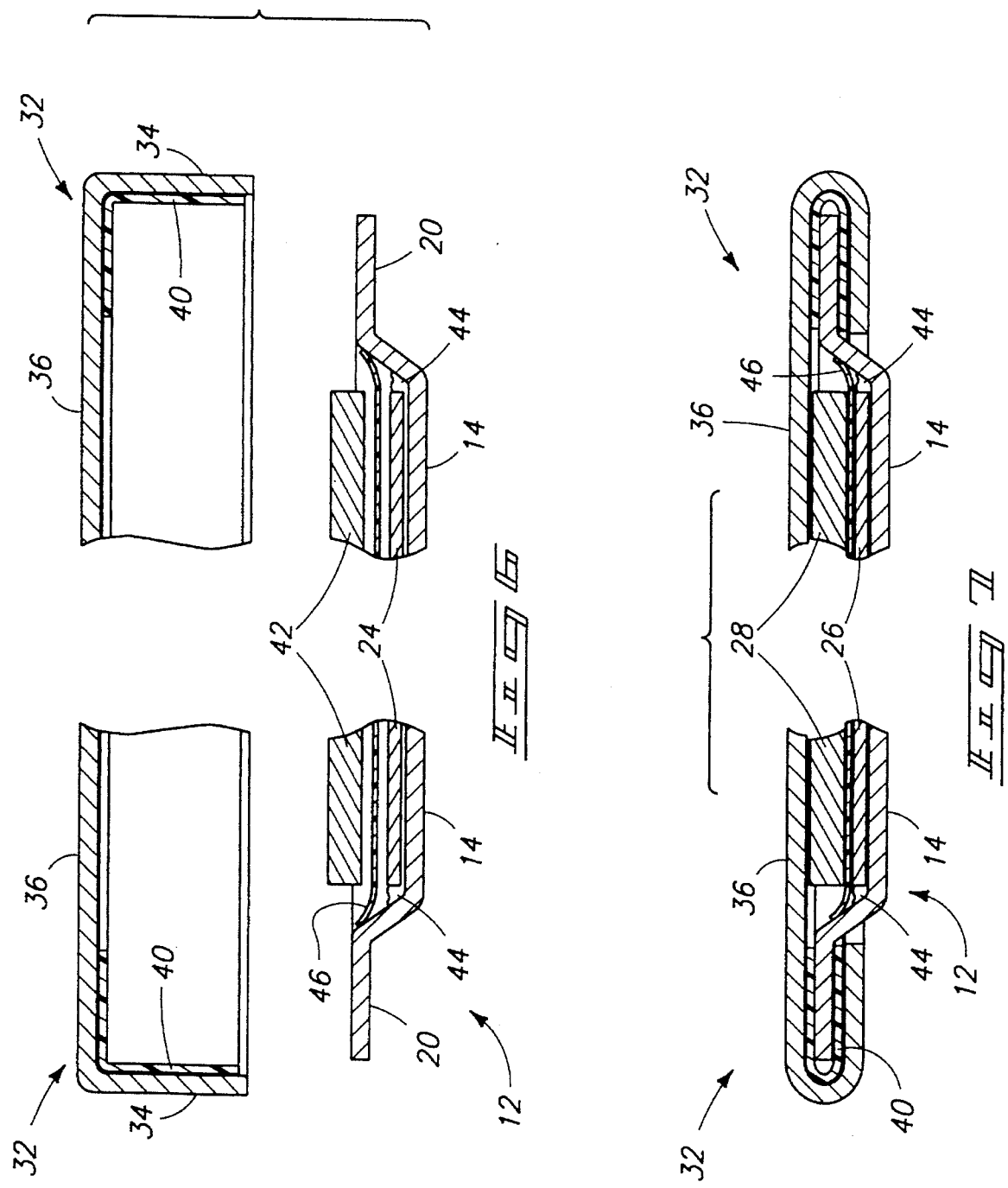

METHOD OF FORMING A BUTTON-TYPE BATTERY AND BUTTON-TYPE BATTERY

TECHNICAL FIELD

This invention relates to methods of forming button-type batteries and to button-type battery constructions.

BACKGROUND OF THE INVENTION

Button-type batteries are small, thin energy cells that are commonly used in watches and other electronic devices requiring a thin profile. A conventional button-type battery includes two electrodes in the form of an anode and a cathode. These are typically separated by a porous separator. An electrolyte is present within pores of the separator.

These internal battery components are housed within a metal casing or housing formed by a lower conductive can and an upper conductive lid. A common prior art material for the can and lid is stainless steel. The can is typically in electrical contact with the cathode to form the positive battery terminal, and the lid is in electrical contact with the anode to form the negative battery terminal. The can and lid are crimped or pressed together to form a fluid-tight seal which entirely encloses the anode, cathode, separator, and electrolyte. An electrically insulating sealing gasket is provided within the primary seal between the lid and can to electrically isolate the two housing members.

There is a need in button-type battery usage to make such energy cells thinner. Today, the thinnest commercially available button-type battery has a thickness of 1.2 mm (47.2 mils). It would be desirable to make a thinner battery, particularly one having a thickness of less than 1 mm (39.4 mils). A countering concern, however, is that the integrity of the fluid-tight seal cannot be compromised simply to achieve the goal of thinner batteries.

One continuing challenge in the fabrication of thin button cells concerns maximizing battery current capacity while maintaining or minimizing size.

BRIEF DESCRIPTION OF THE DRAWINGS

Preferred embodiments of the invention are described below with reference to the following accompanying drawings.

FIG. 1 is diagrammatic side sectional view of button-type battery components at one processing step in accordance with the invention.

FIG. 2 is a top view of FIG. 1.

FIG. 6 is and exploded pre-assembly view of button type battery components in accordance with the invention.

FIG. 7 is an assembled view of the FIG. 6 button type battery components.

DETAILED DESCRIPTION OF THE PREFERRED EMBODIMENTS

Figure 3:
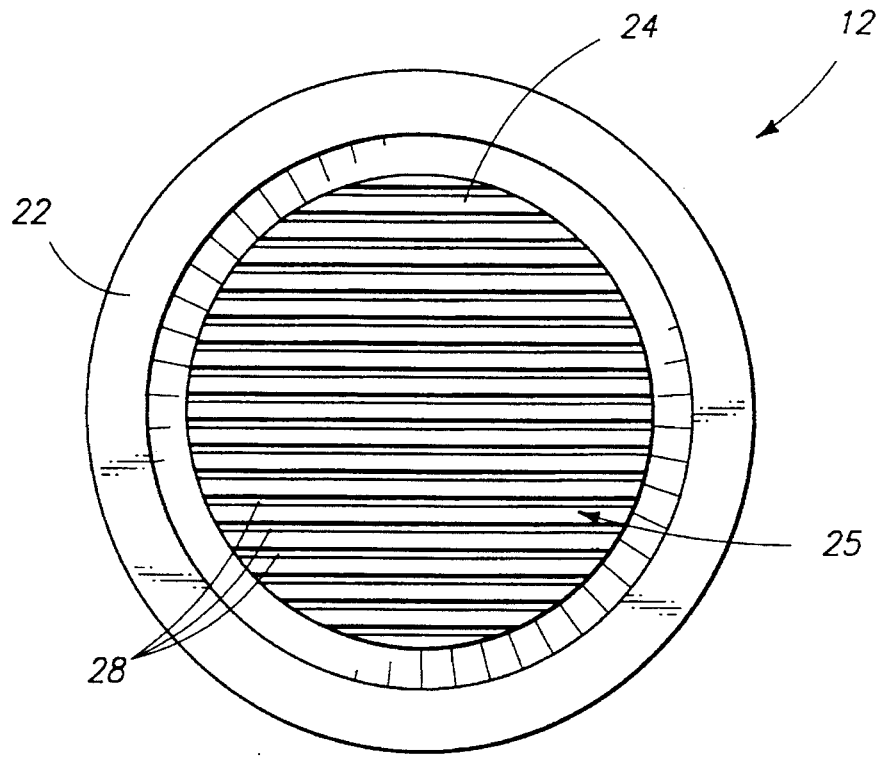
FIG. 3 is a diagrammatic top view of the FIG. 1 battery components at a processing step subsequent to that depicted by FIGS. 1 and 2.

This disclosure of the invention is submitted in furtherance of the constitutional purposes of the U.S. Patent Laws "to promote the progress of science and useful arts" (Article 1, Section 8).

This invention concerns "coin" or "button-type" batteries also referred to as "button cells", and their components. A button-type battery is typically a small, circular-shaped energy cell approximately the size of a small coin. The button-type battery can be constructed in different sizes, with typical diameters being 12 mm, 16 mm, and 20 mm. Other shapes are possible, but the circular shape is most common.

In accordance with one aspect of the invention, a method of forming a button-type battery comprises the following steps:

providing an anode within a first terminal housing member, the anode having an outer exposed surface;

roughening the outer exposed anode surface to increase its surface area from that prior to the roughening; and assembling the first terminal housing member with the roughened anode therein with a cathode, electrolyte and second terminal housing member to form an enclosed housing which holds and protects the anode, the cathode and the electrolyte In accordance with another aspect of the invention, a method of forming a button-type battery comprising the following steps:

providing an anode within a first terminal housing member, the anode having an outer exposed surface, the outer exposed anode surface comprising a passivation barrier film;

penetrating through the outer exposed passivation barrier anode surface to roughen such surface to increase its surface area from that prior to the penetrating and to expose anode material therebeneath; and assembling the first terminal housing member with the roughened anode therein with a cathode, electrolyte and second terminal housing member to form an enclosed housing which holds and protects the anode, the cathode and the electrolyte.

Further, a button-type battery in accordance with another aspect of the invention comprises:

a conductive first terminal housing member;

a conductive second terminal housing member;

an anode, a cathode and an electrolyte between the anode and cathode; the anode, the cathode and the electrolyte being collectively received intermediate the first and second terminal housing members; the first and second terminal housing members forming an enclosed housing which holds and protects the anode, the cathode and the electrolyte; and the anode having an operative surface within the enclosed housing which faces the cathode, the operative anode surface having been toughened prior to final assembly of the button-type battery.

Referring to FIGS. 1 and 2, a conductive first terminal housing member for a button-type battery assembly is indicated generally with reference numeral 12. Such comprises a circular central portion 14 and an annular surrounding peripheral portion 16. Peripheral portion 16 angles away from central portion 14 at a continuous circular, peripheral angle 18. Peripheral portion 16 includes an angling section 20 and an upper, flat horizontal section 22. Angling section 20 defines an internal receptacle volume, while annular portion 22 is utilized for joining with a corresponding juxtaposed section (not shown in FIGS. 1 and 2) of the can or second terminal housing member portion of the button-type battery. An example preferred material of construction for first terminal housing member 12 is 304 stainless steel.

An anode 24 is provided within first terminal housing member 12 over central portion 14. Anode 24 has an outer exposed and operative surface 25. Outer surface 25 typically and undesirably comprises a passivation barrier film 26, typically composed of lithium compounds of nitrides, oxides, carbonates and hydroxides resulting from exposure of the anode to ambient conditions. An example typical thickness for layer 26 is estimated to be anywhere from 25 Angstroms to 1000 Angstroms.

Referring to FIG. 3, and preferably with anode 24 with first terminal housing member 12, outer exposed anode surface 25 is roughened to increase its surface area from that prior to the roughening. Where outer anode surface 25 comprises a passivation barrier film, the roughening preferably penetrates through outer exposed anode surface 25 to both roughen such surface to increase its surface area from that prior to the penetrating and to expose unreacted anode material therebeneath. Example roughening techniques include brushing of the outer surface, for example with a toothbrush. Example and preferred brushing comprises the formation of a first series or plurality of channels 28 in outer exposed surface 25, and through passivation barrier layer 26 to expose unreacted anode material therebeneath, with the channels being formed to ran substantially parallel to or with one another. Such brushing does not necessarily result in removal of the passivation barrier material, but more typically results in mixing or diluting of such material into the pure, unreacted and more massive lithium anode material. The anode can be toughened prior to assembly with the first terminal housing member, although roughening within the housing member immediately before final assembly is more preferred.

Figure 4:
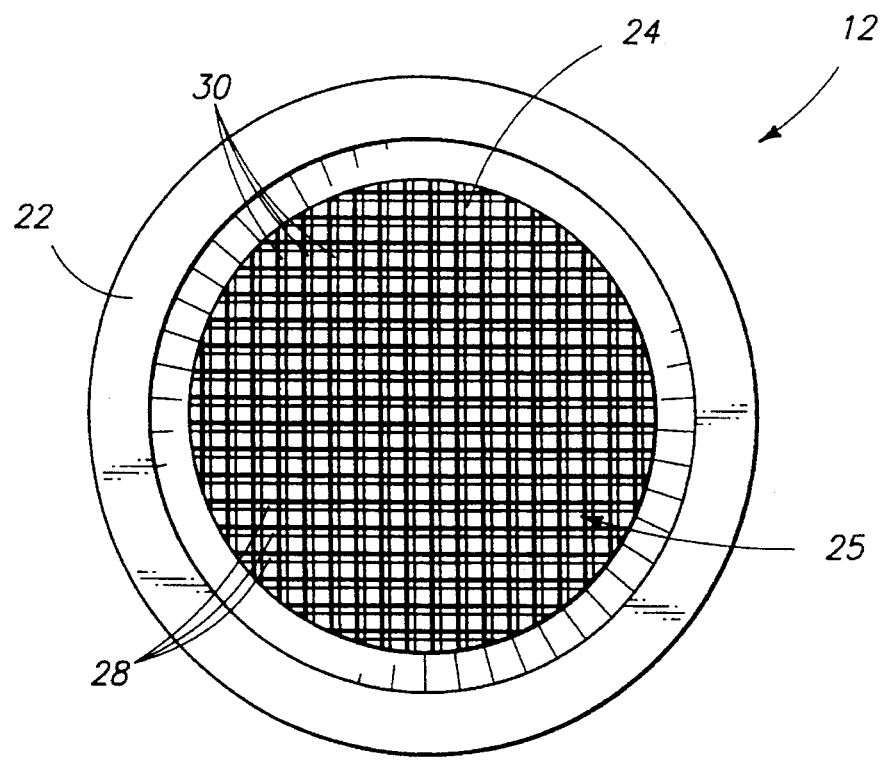
FIG. 4 is a diagrammatic top view of the FIG. 1 battery components at a processing step subsequent to that depicted by FIG. 3.

Referring to FIG. 4, the battery or brush has been rotated 90° and a second set of channels 30 are formed in outer exposed surface 25. The respective channels within each set 28 and 30 are formed to run substantially parallel to one another within the respective set. Further, the channels of first set 28 are formed to run substantially perpendicular to second set channels 30. Brushing in such manner has been determined as an example to increase the surface area by 15–25% over that of an untreated anode surface. Higher or lower surface area increases can be obtained depending on the depth, channel wall angle, and scribe density. Alternate angles of rotation, or a plurality of angled brushings, could also be utilized. Such constitutes but one example of a method of roughening an outer exposed anode surface. Other examples are of course contemplated, such as by with a single scribing stylus as opposed to brushing.

Figure 5:
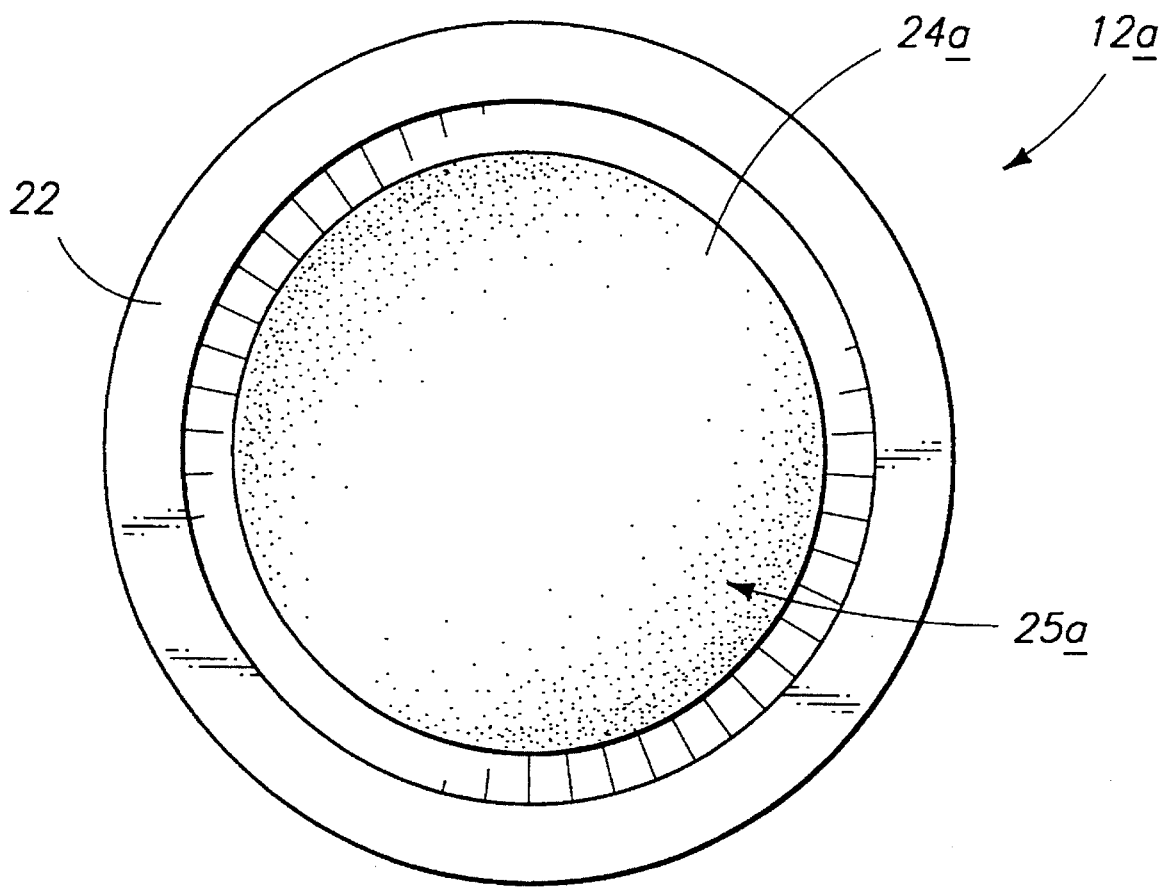
FIG. 5 is a diagrammatic top view of the FIG. 1 battery components after an alternate processing step to that depicted by FIG. 3.

An alternate preferred method of physically roughening includes grit or sand blasting of the outer exposed anode surface, as depicted in FIG. 5.

FIG. 6 illustrates an exploded pre-assembly view of various button-type battery components immediately prior to assembly. Preferably, the above described roughening is conducted immediately prior to battery assembly to avoid further reaction of the outer exposed anode surface where assembly occurs in an oxygen, water vapor, nitrogen, and carbon dioxide containing ambient. In addition to first terminal housing member 12 and anode 24, the button-type battery components include a conductive second terminal housing member 32, also preferably formed of 304 stainless steel. Second terminal housing 32 includes a surrounding peripheral portion 34 and a central portion 36 intermediate surrounding peripheral portion 34. Portion 34 is in the form of a substantially normal peripheral container wall which projects transversely relative to central portion 36. A sealing gasket of a suitable polymer 40 is provided within second terminal housing member 32.

Second terminal housing member 32 and first terminal housing member 12 with anode 24 therein, are positioned in opposing facing juxtaposition to one another. A cathode 42 and liquid electrolyte 44 are provided intermediate first and second terminal housing member central portions 14 and 36, respectively. A porous separator 46 is also typically provided intermediate cathode 42 and anode 24.

Referring to FIG. 7, the various components are assembled and suitably crimped to form an enclosed resultant battery housing which holds and protects the anode, the cathode and the electrolyte. The described roughened anode surface provides a higher closed circuit voltage under load, with an example increase of 25% to more than 100% being typical over conventional prior art anodes having no roughening conducted of the anode within the first terminal housing member prior to assembly. In effect and practice, a roughened anode cell can perform the equivalent function of a much larger cell employing conventional prior art anodes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A button-type battery comprising:

a conductive first terminal housing member;

a conductive second terminal housing member;

an anode, a cathode and an electrolyte between the anode and cathode; the anode, the cathode and the electrolyte being collectively received intermediate the first and second terminal housing members; the first and second terminal housing members forming an enclosed housing which holds and protects the anode, the cathode and the electrolyte; and the anode having an operative surface within the enclosed housing which faces the cathode, the operative anode surface having roughening surface channels formed therein.

2. The button-type battery of claim 1 wherein a plurality of the channels are formed substantially parallel to one another.

3. The button-type battery of claim 1 wherein a plurality of the channels are formed substantially perpendicular to one another.

4. The button-type battery of claim 1 including first and second sets of channels, the channels within each set running substantially parallel to one another, the channels of the first set running substantially perpendicular to the channels of the second set.

5. A button-type battery comprising:

a conductive first terminal housing member;

a conductive second terminal housing member;

an anode, a cathode and an electrolyte between the anode and cathode; the anode, the cathode and the electrolyte being collectively received intermediate the first and second terminal housing members; the first and second terminal housing members forming an enclosed housing which holds and protects the anode, the cathode and the electrolyte; and the anode having an operative surface within the enclosed housing which faces the cathode the operative anode surface having been roughened prior to final assembly of the button-type battery.

6. The button-type battery of claim 5 wherein the pre-assembly roughening was conducted by brushing the operative anode surface.

7. The button-type battery of claim 5 wherein the pre-assembly roughening was conducted by grit blasting the operative anode surface.

8. A method of forming a button-type battery comprising the following steps:

providing an anode within a first terminal housing member, the anode having an outer exposed surface;

roughening the outer exposed anode surface to increase its surface area from that prior to the roughening; and assembling the first terminal housing member with the roughened anode therein with a cathode, electrolyte and second terminal housing member to form an enclosed housing which holds and protects the anode, the cathode and the electrolyte.

9. The method of forming a button-type battery of claim 8 wherein the roughening step is conducted after the anode has been provided within the first terminal housing member.

10. The method of forming a button-type battery of claim 8 wherein the roughening step is conducted before the anode has been provided within the first terminal housing member.

11. The method of forming a button-type battery of claim 8 wherein the roughening comprises forming channels in the outer exposed surface, a plurality of the channels being formed substantially parallel to one another.

12. The method of forming,, a button-type battery of claim 8 wherein the roughening comprises forming channels in the outer exposed surface, a plurality of the channels being formed substantially perpendicular to one another.

13. The method of forming a button-type battery of claim 8 wherein the toughening comprises forming first and second sets of channels in the outer exposed surface, the channels within each set being formed to run substantially parallel to one another, the channels of the first set being formed to run substantially perpendicular to the channels of the second set.

14. The method of forming a button-type battery of claim 8 wherein the toughening comprises brushing the outer exposed anode surface.

15. The method of forming a button-type battery of claim 8 wherein, the roughening comprises brushing the outer exposed anode surface; and the brushing comprising forming channels in the outer exposed surface, a plurality of the channels being formed substantially parallel to one another.

16. The method of forming a button-type battery of claim 8 wherein, the roughening comprises brushing the outer exposed anode surface; and the brushing comprises forming channels in the outer exposed a plurality of the channels being formed substantially perpendicular to one another.

17. The method of forming a button-type battery of claim 8 wherein, the roughening comprises brushing the outer exposed anode surface; and the brushing comprises forming, first and second sets of channels in the outer exposed surface, the channels within each set being formed to run substantially parallel to one another, the channels of the first set being formed to run substantially perpendicular to the channels of the second set.

18. The method of forming a button-type battery of claim 8 wherein the roughening comprises scribing the outer exposed anode surface with a stylus.

19. The method of forming a button-type battery of claim 8 wherein the roughening comprises grit blasting the outer exposed anode surface.

20. A battery produced according to the process of claim 8.

21. A method of forming a button-type battery comprising the following steps:

providing an anode within a first terminal housing member, the anode having an outer exposed surface, the outer exposed anode surface comprising a passivation barrier film;

penetrating through the outer exposed passivation barrier anode surface to roughen such surface to increase its surface area from that prior to the penetrating and to expose anode material therebeneath; and assembling the first terminal housing member with the roughened anode therein with a cathode, electrolyte and second terminal housing member to form an enclosed housing which holds and protects the anode, the cathode and the electrolyte.

22. The method of forming a button-type battery of claim 21 wherein the penetrating step is conducted after the anode has been provided within the first terminal housing member.

23. The method of forming a button-type battery of claim 21 wherein the penetrating step is conducted before the anode has been provided within the first terminal housing member.

24. The method of forming a button-type battery of claim 21 wherein the penetrating step comprises forming channels in the outer exposed surface, a plurality of the channels being formed substantially parallel to one another.

25. The method of forming a button-type battery of claim 21 wherein the penetrating step comprises forming channels in the outer exposed surface, a plurality of the channels being formed substantially perpendicular to one another.

26. The method of forming a button-type battery of claim 21 wherein the penetrating step comprises forming first and second sets of channels in the outer exposed surface, the channels within each set being formed to run substantially parallel to one another, the channels of the first set being formed to run substantially perpendicular to the channels of the second set.

27. The method of forming a button-type battery of claim 21 wherein the penetrating step comprises brushing the outer exposed anode surface.

28. The method of forming a button-type battery of claim 21 wherein, the penetrating step comprises brushing the outer exposed anode surface; and the brushing comprising forming channels in the outer exposed surface, a plurality of the channels being formed substantially parallel to one another.

29. The method of forming a button-type battery of claim 21 wherein, the penetrating step comprises brushing the outer exposed anode surface; and the brushing comprises forming channels in the outer exposed surface, a plurality of the channels being formed substantially perpendicular to one another.

30. The method of forming a button-type battery of claim 21 wherein, the penetrating step comprises brushing the outer exposed anode surface; and the brushing comprises forming first and second sets of channels in the outer exposed surface, the channels within each set being formed to run substantially parallel to one another, the channels of the first set being formed to run substantially perpendicular to the channels of the second set.

31. The method of forming a button-type battery of claim 21 wherein the penetrating step comprises grit blasting the outer exposed anode surface.

32. The method of forming a button-type battery of claim 21 wherein the roughening comprises scribing the outer exposed anode surface with a stylus.

33. A battery produced according to the process of claim 21.

* * * * *